United States Patent Office 3,082,659
Patented Mar. 26, 1963

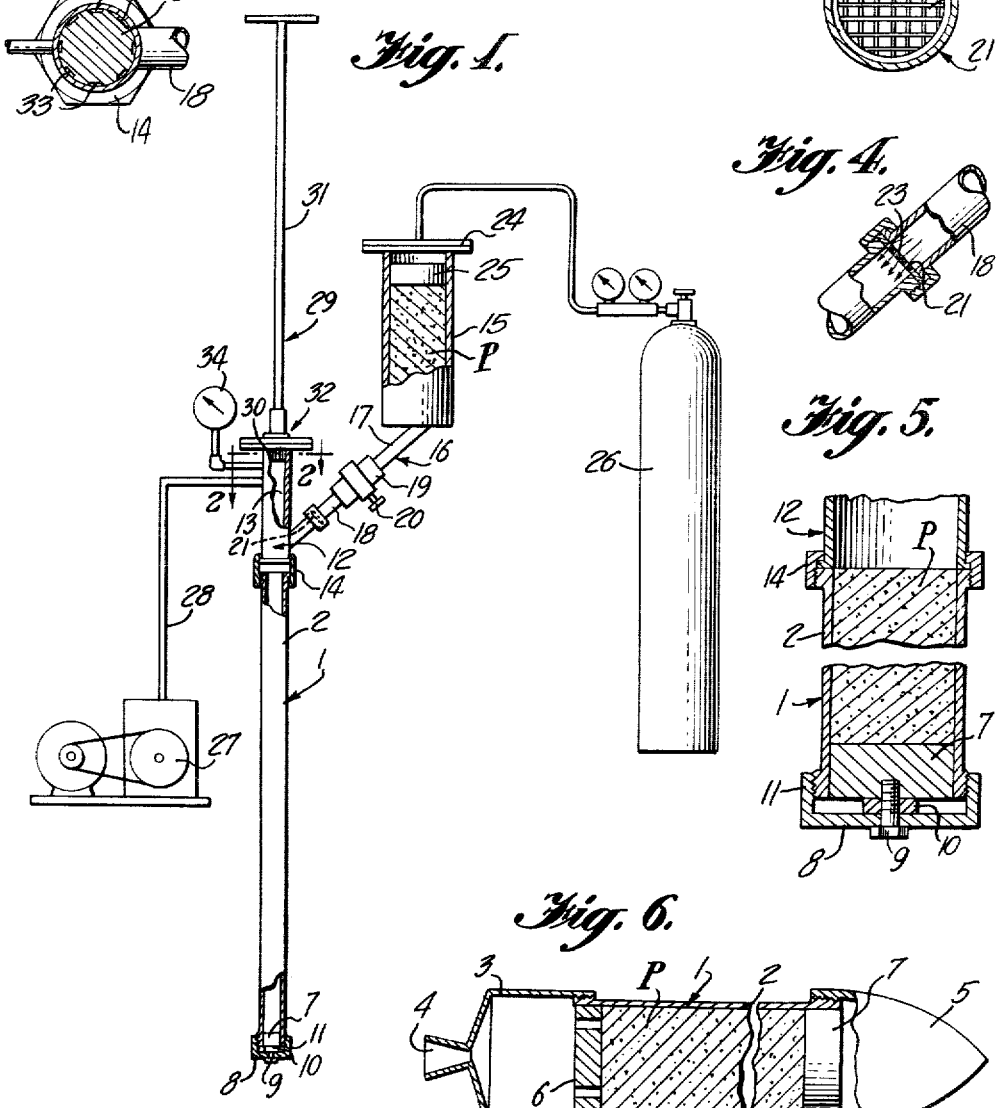

3,082,659
LOADING DEVICE
Keith E. Rumbel, Falls Church, Joe M. Burton, Alexandria, and Elbert P. Sullivan, Jr., Springfield, Va., assignors to Atlantic Research Corporation, Alexandria, Va., a corporation of Virginia
Filed Mar. 23, 1959, Ser. No. 801,394
3 Claims. (Cl. 86—20)

This invention relates to a method and means for charging the fuel reservoirs of devices which employ a plastic, extrudable monopropellant for the generation of high energy gases.

There have recently been developed for use in gas generating apparatus, such as rocket motors, gas turbines and the like, a number of plastic monopropellants, which are particularly adapted for extrusion as cohesive, shape-retaining, continuously advancing masses or columns into a combustion chamber, where they are burned to generate high energy gases for developing thrust or power or for providing heat or gas pressure. The term monopropellant refers to a composition which is substantially self-sufficient with regard to its oxidant requirements. The compositions have thixotropic properties and are sufficiently fluid above a certain finite stress to be fed at ambient temperatures through shaping apertures into a combustion chamber. The leading face of the shape-retaining column presents a burning surface of predeterminable area, which can be varied and controlled by varying the rate of extrusion. The plastic monopropellants combine many of the advantages and eliminate many of the disadvantages of previously known liquid or solid propellants used to power similar devices.

Such plastic monopropellants are normally stored in a fuel tank from which they are extruded through an apertured plate or other suitable extrusion member into a combustion chamber. The primary purpose of the extrusion member is to divide the propellant into a plurality of separate masses or columns, thereby to increase the total burning area of monopropellant available in a combustion chamber of preferably minimum length.

The extruding column of monopropellant burns on all surfaces exposed in the combustion chamber. When burning equilibrium is reached at a given rate of extrusion, the surface of the propellant column within the combustion chamber converges in the downstream direction forming a downstream edge or apex, depending on the shape of the extrusion orifice. The angle of convergence at equilibrium is determined only by the ratio of the linear rate of extrusion to the linear burning rate of the particular monopropellant, regardless of the size of the extrusion aperture. The higher the value of this ratio, the more acute is the downstream angle of convergence resulting in a longer column of burning propellant having a proportionately larger burning surface area. The mass rate of burning is proportional to the burning surface area and to the linear burning rate. Consequently, the linear rate of extrusion is at equilibrium the determinative factor for the mass rate of burning.

It will be seen, from the foregoing discussion of burning properties, that the presence, in the plastic monopropellant composition of air bubbles, will, as they arrive at the burning surface of the extruding mass, introduce undesirable and unpredictable fluctuations of the mass burning rate and mass rate of gas generation and must, therefore, be eliminated. Entrained air also disadvantageously reduces loading density of the propellant. It also functions as a cooling diluent in the combustion chamber, which may be undesirable in many cases.

Such plastic monopropellants can also be employed substantially as end-burning grains by loading the entire mass of propellant directly into the combustion chamber, which, thereby also becomes the fuel chamber, and igniting the exposed surface of the monopropellant mass. The burning surface then regenerates progressively down the mass of monopropellant just as in the case of an end-burning solid propellant grain, with the mass rate of gas generation being determined for the particular propellant by such factors as the burning surface area and the linear burning rate at the prevailing pressures and ambient temperature of the monopropellant mass. It is obvious that in this mode of burning, as well as in the extrusive mode of burning, the presence of entrained air bubbles is undesirable for similar reasons.

Unless the handling of the plastic propellant from its manufacture up to the point of packing of the fuel chamber in the apparatus in which it is employed is carried out under vacuum, an expensive and cumbersome expedient, it is practically impossible to prevent the mass from picking up, entraining, or becoming otherwise associated with ambient air. While the manufacturer may subject the plastic propellant to deaeration, it is unavoidable that the mass will be contaminated with air in the process of packing it into the propellant storage chamber unless means be provided for exhausting the air from said chamber and from said propellant while enroute to said propellant fuel chamber from the supply tank and while it is being packed in the fuel chamber.

One of the objects of the invention is to provide a method for charging plastic monopropellant into a fuel chamber in such manner as both to prevent its entraining air and to remove any previously entrained air while in its path of travel from the supply source until after it reaches the propellant fuel chamber.

Anther object of the invention is to provide a method for charging the plastic monopropellant into a propellant fuel chamber as above described, including the steps of splitting the extruded mass of propellant moving toward said fuel chamber into a plurality of separate portions at a region in its path of movement where it is under vacuum, for improving the efficiency of the extraction of air therefrom.

A further object of the invention is to provide a system for charging a fuel chamber with plastic monopropellant including a vacuum hood adapted to be applied in air-tight manner to an end of the propellant fuel chamber, to which hood the monopropellant is transferred under pressure from a source of supply of the same, a tamper extending through said hood from without, permitting the propellant in the propellant fuel chamber to be tamped within said fuel chamber while under vacuum, the tamper preferably being constructed to permit the escape of such air as might be entrapped between it and the propellant mass being tamped.

Still another object of the invention is to provide a conduit system for charging a propellant fuel chamber with plastic monopropellant including a vacuum hood adapted to be applied in air-tight manner to the propellant fuel chamber, to which hood the monopropellant is forced from a supply source, a tamper extending through said hood permitting the propellant to be tamped in said fuel chamber to consolidate the plastic, shape-retentive mass, the system in the zone affected by the vacuum maintained in said hood being provided with splitting means in the path traversed by said monopropellant for dividing the latter into smaller parts for the better extraction of air therefrom.

Other objects of the invention will appear as the following description of a practical embodiment thereof proceeds.

In the drawing which forms a part of the following specification and throughout the figures of which the same reference characters have been employed to designate identical parts, FIGURE 1 is a diagrammatic view in elevation illustrating apparatus for carrying out the method of the invention.

FIGURE 2 is a transverse section taken along line 2—2 of FIGURE 1, showing the tamper.

FIGURE 3 is a large scale view in cross section through the flow splitter.

FIGURE 4 is a fragmentary view in longitudinal section on a large scale showing the flow splitter in the conduit of relatively small diameter between the charging pot and the vacuum hood.

FIGURE 5 is a longitudinal section on a larger scale through the propellant fuel chamber, illustrating the means for securing the extruding piston against displacement during the charging operation.

FIGURE 6 is a diagrammatic longitudinal section of a rocket motor incorporating the removable propellant fuel chamber shown in FIGURE 1.

Referring now in detail to the drawing, FIGURE 1 depicts a pilot system that has been repeatedly operated with success to charge the propellant fuel chamber of the power plant of a rocket motor.

It is contemplated that the propellant fuel chamber be separable from the device which it serves, so that it can be brought to the charging apparatus as shown in FIGURE 1, in which the propellant fuel chamber is designated by the reference numeral 1. It is, however, within the purview of the invention to have the charging apparatus transportable to the place where the device is both loaded and assembled. It is further within the purview of the invention that the fuel chamber can be loaded while attached to at least some other portion of the gas-generating device.

In FIGURE 1, the propellant fuel chamber as shown is a cylinder 2 of uniform diameter having external screw threads at its opposite ends and being open at its upper end. FIGURE 6 shows the propellant fuel chamber 1 in assembled relation between a combustion chamber and a pay-load, combustion chamber 3 being provided with a thrust nozzle 4 at one end and at the other end being screwed upon the adjacent end of the propellant fuel chamber. The pay-load 5 is screwed to the opposite end of said propellant fuel chamber. An extrusion plate 6 divides the combustion chamber from the propellant fuel chamber. The extrusion plate, as shown, is provided with a plurality of orifices. A free piston 7, which slidably fits the cylinder 2, is positioned at the opposite end of the propellant fuel chamber. Between the piston 7 and the extrusion plate 6, the propellant fuel chamber is packed full with a mass of the plastic monopropellant P, no air spaces being left. The pay-load includes means, not shown, for applying controlled pressure to the piston 7 for extruding the propellant into the combustion chamber during the burning cycle governed by sensing means within the combustion chamber, not shown, to make the rate of extrusion responsive to combustion chamber pressure. As aforementioned the monopropellant can also be burned as an end-burning grain directly in the combustion chamber, in which case the extrusion plate and pressurizing extrusion means can be dispensed with and the piston 7 replaced by a fixed end wall.

Referring again to FIGURE 1, it will be understood that the upper end of the cylinder 2 is the end to which the nozzle is normally secured and which has been removed for charging, and that the lower end is closed by the piston or follower 7 and that the latter is temporarily held in place during the charging operation by a yoke 8, diametrically bridging the lower end of the cylinder 2 and carrying a bolt 9, which screws into a socket in the adjacent face of the piston there being a spacer 10 between the yoke and piston. The yoke has threaded arcuate ears 11, which engage the threads at the end of the propellant fuel chamber. The bolt is turned until it draws the piston tight against the spacer. The piston is thus held while the propellant fuel chamber is being charged, to prevent the piston from being displaced by the strokes of the tamper.

The propellant fuel chamber is preferably held in an axially vertical attitude while being charged, its upper end being beneath the vacuum hood 12. The latter comprises a cylindrical body 13, the external and internal diameters of which are the same as the corresponding diameters of the propellant fuel chamber 1. The lower end of the vacuum hood is provided with a peripheral flange which is engaged by rotatable ring nut 14. The ring nut is internally threaded to engage the threads at the upper end of the propellant fuel chamber so that the fuel chamber can be drawn tightly against the vacuum hood. A gasket, not shown, may be used to seal the temporary joint between the hood 12 and the propellant fuel chamber.

The source of supply is the charging pot or extrusion chamber 15, which is connected by a conduit 16 to the propellant fuel chamber and serves the latter with plastic propellant. For convenience the charging pot should be sufficient capacious to hold a full charge for the propellant fuel chamber and may be much larger if desired to hold a plurality of charges. The conduit 16 is sectional, for convenience in ridding it of residual propellant after use, the sections 17 and 18 being connected by a section of flexible hose 19, suitably clamped by clamp 20.

The section 18 is subdivided, the adjacent ends of the divided parts being flanged. A flow splitter or division plate 21 is clamped between the flanges and extends across the conduit. The flow splitter, shown in plan in FIGURE 3, comprises a disc including a rim 22 and a core of crossed wires 23 tightly bridging the aperture within said rim. It is preferably placed as close as practicable to the end of conduit 16. Other equivalent divider means can be substituted for the wires. The conduit 16 is of relatively small diameter while the internal diameter of the vacuum hood and fuel chamber is relatively large, so that the extruded mass of plastic monopropellant, shaped and sized by its extrusion through the conduit 16, is smaller than the diameter of the vacuum hood and fuel chamber, thereby providing ample space about the discrete extrusions or columns into which space air can be drawn from the columns and evacuated. The extrusions of smaller diameter also facilitate loading of the fuel chamber since they can fall to the bottom of the chamber without being embraced and held by the walls on the way down. Hood 12 as well as propellant feed chamber 1 extend coaxially in a downward direction so that the divided portions of the extruded propellant can descend by gravity through the hood into the propellant chamber.

The charging pot 15 is flanged at the top and has a cover 24 which fits down upon the flange in air-tight manner. Said pot is refilled from time to time from a suitable supply source, not shown, and in any convenient or acceptable manner. The charging pot is of uniform internal diameter and the free piston 25, which slidably fits the charging pot rests upon the body of propellant within said pot. The piston 25, as shown, is operated by fluid pressure to extrude the propellant through the conduit 16 into the vacuum hood. The fluid pressure is derived from a pressure tank 26 of a compressed gas, such as air or nitrogen. Any suitable pressurizing means other than fluid pressure can also be employed.

Vacuum is maintained in the hood 12 by the motor driven pump 27, which is connected to the hood by conduit 28, and is measured by vacuum gage 34. The vacuum extends from the flow splitter 21 to the lower end of the chamber of cylinder 2 or such portion thereof as may not be filled with compacted propellant. The flow splitter divides the column as it is forced through the plane of the wires 23 into a bundle of discrete columns, thereby increasing the surface and reducing the thickness exposed to vacuum, thereby facilitating the extraction of air. The vacuous atmosphere extends throughout the flow path of the discrete columns thereby functioning with a large measure of efficiency in extracting air from the monopropellant. Since the plastic propellants having the shape retentive cohesiveness contemplated for use in the present invention are not sufficiently fluid to settle and consolidate under the pressure of their own weight, within a reasonable time, the extruded strands descending into the propellant fuel chamber tend to pile loosely with spaces between them. It is, therefore, necessary to consolidate the propellant in the fuel chamber into a continuous mass so that there are no interstices within the propellant column which would cause fluctuations in the burning surface area and, therefore, in the mass burning rate of the propellant columns when they are extruded into and burned in the combustion chamber.

For the purpose of compacting the propellant in the propellant chamber, tamper 29 is provided having the form of a plunger, with a head 30 and plunger rod 31, the latter being reciprocable through a packed gland 32 in the upper end of the vacuum hood. The tamper is in axial alignment, respectively, with the propellant fuel chamber and hood. The head 30 of the tamper slidably fits within said hood and the attached propellant fuel chamber, but its periphery is provided with a circumferential series of indents 33, affording spaces through which any air below the tamper in the course of its downward stroke, as well as such air as is displaced from the interstices between the loosely piled propellant strands during compaction, can be exhausted by the vacuum pump. Provision for such air venting can also be provided by a tamper which fits loosely in the chamber.

In operation, a relatively small amount of propellant is charged into the propellant chamber at a time. This is packed by a few blows of the tamper. Another portion of the charge is admitted, then tamped in the manner described, and so on until the propellant chamber is completely filled.

Obviously the charging of the propellant chamber is intermitent, the tamping being done between the charging periods so that the propellant will not be dropped upon the upper face of the tamper head while the latter is working below the level of the mouth of the conduit 16. At the end of each tamping period the tamper head will be in the upper part of the hood, as shown.

In the case of larger embodiments of the charging apparatus within the concept of the invention, it may be desirable to operate the apparatus automatically, in which case the tamper and piston 25 would be synchronously and intermittently driven to fit the operating periods of the tamper into the idle periods of the charging piston, whereby the operating period of the tamper ends with its head above the level of the propellant inlet to the vacuum hood.

The monopropellant employed in the device of this invention, as aforementioned, is preferably a plastic mass which is sufficiently cohesive to retain a shaped form and which is extrudable under pressure at ambient temperatures. Many different plastic monopropellant compositions tailored to different performance requirements can be made having these desired physical characteristics. The monopropellant compositions can be a double-base type propellant, such as nitroglycerine gelled with nitrocellulose. Generally, it will comprise a stable dispersion of a finely-divided, insoluble solid oxidizer in a continuous matrix of an oxidizable liquid fuel.

The liquid fuel can be any oxidizable liquid, preferably an organic liquid containing carbon and hydrogen. Suitable liquid fuels include hydrocarbons, such as triethyl benzene, dodecane, liquid polyisobutylene, and the like; compounds containing oxygen linked to a carbon atom, as, for example, esters, like dimethyl maleate, diethyl phthalate, dibutyl oxalate, and the like; alcohols, such as benzyl alcohol, triethylene glycol and the like; ethers such as methyl α-naphthyl ether and the like; and many others.

The solid oxidizer can be any suitable, active oxidizing agent which yields an oxidizing element such as oxygen, chlorine or fluorine readily for combustion of the fuel and which is insoluble in the liquid fuel vehicle. Such oxidizers include inorganic oxidizing salts such as ammonium, sodium and potassium perchlorate or nitrate and metal peroxides such as barium peroxide.

The amount of solid oxidizer incorporated varies, of course, with the particular kind and concentration of fuel components in the formulation, the particular oxidizer, and the specific requirements for a given use, in terms, for example, of required heat release and rate of gas generation, and can readily be computed by those skilled in the art. Since the liquid vehicle can, in many instances, be loaded with as high as 80 to 90% of finely-divided solids, stoichiometric oxidizer levels with respect to the fuel components can generally be achieved when desired, as for example, in rocket applications where maximum heat release and specific impulse are of prime importance. In some applications, stoichiometric oxidization levels may not be necessary or even desirable, as, for example, in gas turbines where relatively low combustion chamber temperatures are preferred, and the amount of oxidizer can be correspondingly reduced. Sufficient oxidizer must, of course, be incorporated to maintain active, gas-generating combustion.

Finely-divided solid metal powders such as aluminum or magnesium, may be incorporated in the monopropellant composition as an additional fuel component along with the liquid fuel. Such metal powders possess the advantages both of increasing the fuel density and improving the specific impulse of the monopropellant because of their high heats of combustion.

The physical properties of the plastic monopropellant in terms of shape-retentive cohesiveness, tensile strength and thioxotropy, can be improved by addition of a gelling agent, such as a polymer, e.g. polyvinyl chloride, polyvinyl acetate, cellulose acetate, ethyl cellulose, or metal salts of higher fatty acids, such as the sodium or magnesium stearates or palmitates. The desired physical properties can also be obtained without a gelling agent by using a liquid vehicle of substantial intrinsic viscosity, such as liquid organic polymers, e.g. liquid polyisobutylene, liquid siloxanes, liquid polyesters, and the like.

Many other plastic monopropellant compositions can also be used. It is, therefore, to be understood that this invention is not limited to use with any particular plastic monopropellant composition, but rather is directed to a method and apparatus particularly adapted for loading any plastic monopropellant having the physical property of shape retentive cohesiveness into a fuel chamber.

While we have in the above description disclosed practical embodiments of our invention, these are illustrative of other embodiments that may also be within the scope of the invention. It is to be understood, therefore, by those skilled in the art that various changes may be made in the construction and arrangement of parts and in the substitution of equivalents without departing from the spirit and scope of the invention as claimed.

We claim:

1. In apparatus for charging a cylinder with plastic monopropellant, said cylinder being positioned substantially vertically and being closed at its lower end, in combination, a hood for positioning above said cylinder and constructed to be detachably coupled thereto at its upper end, means forming an extrusion chamber constituting a reservoir for the monopropellant, means for extruding monopropellant from said chamber, a conduit between said extrusion chamber and hood for conducting an extruded column of monopropellant to said hood, a perforated divider plate across said conduit at a point adjacent said hood for dividing the extruding column into a bundle of discrete columns, the pattern of perforations in said plate being such that the cross section of said bundle is smaller than the cross sectional area of said hood and of said cylinder, and means connected to said hood for uninterruptedly drawing vacuum in said hood and cylinder, the vacuum embracing the bundle of discrete columns throughout the length of their flow path.

2. In apparatus for charging a cylinder with plastic monopropellant, in combination, the cylinder to be charged, positioned substantially vertically and being closed at its lower end, a hood for positioning above said cylinder detachably coupled thereto at its upper end, means forming an extrusion chamber constituting a reservoir for the monopropellant, means for extruding monopropellant from said chamber, a conduit between said extrusion chamber and hood for conducting an extruded column of monopropellant to said hood, a perforated divider plate across said conduit at a point adjacent said hood for dividing the extruding column into a bundle of discrete columns, the pattern of perforations in said plate being such that the cross section of said bundle is smaller than the cross sectional area of said hood and of said cylinder, means connected to said hood for uninterruptedly drawing vacuum in said hood and cylinder, the vacuum embracing the bundle of discrete columns throughout the length of their flow path, means in said hood reciprocable axially in said hood and said cylinder for compacting the monopropellant by repeated impact therewith, in a series of steps as it accumulates, into a homogeneous cylinder-fitting mass characterized by substantial absence of voids and entrapped air.

3. Apparatus as claimed in claim 2, wherein said extruding means comprises means permitting intermittent extrusion during the charging operation, and said compacting means comprises a plunger head and an operating rod attached thereto extending through a gland in said hood, said plunger head having a repose position in said hood out of the path of flow of said bundle of discrete columns during the extruding phases of said intermittently operating extruding means.

References Cited in the file of this patent
UNITED STATES PATENTS

| | | |
|---|---|---|
| 538,618 | Maxim | Apr. 30, 1895 |
| 988,798 | Maxim | Apr. 4, 1911 |
| 1,282,623 | Paris | Oct. 22, 1918 |
| 2,469,342 | Richardson | May 3, 1949 |
| 2,926,386 | Hutchinson | Mar. 1, 1960 |
| 2,928,123 | Ramsey | Mar. 15, 1960 |
| 2,939,176 | Adelman | June 7, 1960 |

FOREIGN PATENTS

| | | |
|---|---|---|
| 776,614 | Great Britain | June 12, 1957 |

UNITED STATES PATENT OFFICE

CERTIFICATE OF CORRECTION

Patent No. 3,082,659                          March 26, 1963

Keith E. Rumbel et al.

It is hereby certified that error appears in the above numbered patent requiring correction and that the said Letters Patent should read as corrected below.

Column 7, line 6, for "in combination, the cylinder to be charged," read -- said cylinder being --; line 8, after "end," insert -- in combination, --; same column 7, line 9, after "cylinder" insert -- and constructed to be --.

Signed and sealed this 12th day of November 1963.

(SEAL)
Attest:

ERNEST W. SWIDER                      Edwin L. Reynolds

Attesting Officer                    Acting Commissioner of Patents